US008611293B2

(12) United States Patent
Xin et al.

(10) Patent No.: US 8,611,293 B2
(45) Date of Patent: Dec. 17, 2013

(54) EFFICIENT CHANNEL SEARCH WITH ENERGY DETECTION

(75) Inventors: Yan Xin, Princeton, NJ (US); Guosen Yue, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 440 days.

(21) Appl. No.: 13/029,726

(22) Filed: Feb. 17, 2011

(65) Prior Publication Data

US 2011/0223911 A1 Sep. 15, 2011

Related U.S. Application Data

(60) Provisional application No. 61/313,389, filed on Mar. 12, 2010, provisional application No. 61/313,396, filed on Mar. 12, 2010.

(51) Int. Cl.
*H04W 4/00* (2009.01)

(52) U.S. Cl.
USPC .......................................... 370/329; 370/431

(58) Field of Classification Search
None
See application file for complete search history.

(56) References Cited

U.S. PATENT DOCUMENTS

2007/0060053 A1*  3/2007  Haubrich et al. ............... 455/39
2008/0130606 A1*  6/2008  Chang et al. .................. 370/342
2009/0310548 A1   12/2009 Kwon et al.

FOREIGN PATENT DOCUMENTS

KR    10-2009-0125541 A    12/2009

OTHER PUBLICATIONS

Dragalin, V., "A Simple and Effective Scanning Rule for a Multi-Channel System", Metrika vol. 43, No. 1, Dec. 1996, pp. 165-182.
Kim, S. J., et al., "Rate-Optimal and Reduced-Complexity Sequential Sensing Algorithms for Cognitive OFDM Radios", 43rd Annual Conference on Information Sciences and Systems, Mar. 2009, pp. 141-146.
Kim, S. J., et al., "Rate-Optimal and Reduced-Complexity Sequential Sensing Algorithms for Cognitive OFDM Radios", EURASIP Journal on Advances in Signal Processing, vol. 2009, Mar. 2009, 11 pages.
Lai, L. et al., "Quickest Sequential Search Over Multiple Sequences", Annal of Statistics, May 2009, 27 pages.
Quan, Z. et al., "Wideband Spectrum Sensing in Cognitive Radio Networks", Proceedings of the 2008 IEEE International Conference on Communications, May 2008, pp. 901-906.
Xin, Y. et al, "Fast Wideband Spectrum Scanning for Multi-Channel Cognitive Radio Systems", Proc. Conference on Information Sciences and Systems, Mar. 2010, 6 pages.

* cited by examiner

*Primary Examiner* — Kibrom T Hailu
(74) *Attorney, Agent, or Firm* — Joseph Kolodka

(57) ABSTRACT

Methods and systems for cognitive radio channel searching are shown that include determining an energy detection threshold and a number of samples that will find a free channel in a minimum searching time, based on a number of channels K and a channel occupancy probability $\pi_0$, constrained by a target acceptable misdetection probability and a target acceptable false alarm probability. The search includes an energy detection threshold and a number of samples that will find a free channel in a minimum average searching time. The K channels are searched with a signaling device using the determined energy detection threshold and the determined number of samples to find a free channel.

8 Claims, 8 Drawing Sheets

EFFICIENT CHANNEL SEARCH WITH ENERGY DETECTION

RELATED APPLICATION INFORMATION

This application claims priority to provisional application Ser. No. 61/313,389 filed on Mar. 12, 2010, incorporated herein by reference. This application further claims priority to provisional application Ser. No. 61/313,396 filed on Mar. 12, 2010, incorporated herein by reference. This application is further related to application Ser. No. 13/029,675, filed concurrently herewith, incorporated herein by reference.

BACKGROUND

1. Technical Field

The present invention relates to multichannel systems and, in particular, to systems and methods for efficient channel searching in cognitive radio.

2. Description of the Related Art

In a cognitive radio (CR) network, secondary (unlicensed) users (SUs) are allowed to opportunistically access a licensed spectrum that is not currently being occupied by primary (licensed) users (PUs). Spectrum sensing in a CR network allows a network to protect primary transmissions from interferences due to secondary usage of the spectrum. Extant techniques for spectrum sensing rely on unrealistic assumptions, expensive equipment, and highly complex methods.

SUMMARY

A method for cognitive radio channel searching is shown that includes determining an energy detection threshold and a number of samples that will find a free channel in a minimum searching time, based on a number of channels K and a channel occupancy probability $\pi_0$, constrained by a target acceptable misdetection probability and a target acceptable false alarm probability. The method further includes searching the K channels with a signaling device using the determined energy detection threshold and the determined number of samples to find a free channel.

A method for cognitive radio channel searching is shown that includes determining an energy detection threshold and a number of samples that will find a free channel in a minimum searching time, based on a number of channels K and a channel occupancy probability $\pi_0$, constrained by a target acceptable misdetection probability and a target acceptable false alarm probability. The determining includes determining an energy detection threshold based on the false alarm probability and the minimum sample number and determining a number of samples to take for each channel using the misdetection probability and the false alarm probability. The method also includes searching the multiple channels with a signaling device, including sampling a channel the determined number of times, calculating a test statistic based on the samples for the channel, and comparing the test statistic to the determined threshold to determine whether the channel is free.

A cognitive radio device is shown that includes a search parameter determination module configured to determine an energy detection threshold and a number of samples that will find a free channel in a minimum searching time, based on a number of channels K and a channel occupancy probability $\pi_0$, constrained by a target acceptable misdetection probability and a target acceptable false alarm probability. The device also includes a search module configured to search the K channels with a signaling device using the determined energy detection threshold and the determined number of samples to find a free channel.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles quickly and accurately locate an unoccupied channel (or determine that there is no unoccupied channel) from a set of multiple candidate channels, for a secondary user (SU) with a single detector. The SU can only observe one channel at a time and needs to switch from one channel to another when necessary. A design criterion is provided that minimizes the average searching time subject to the constraints on the error probabilities. Notably, the design criterion described below does not depend on a cost structure. Using this design criterion, two efficient channel search methods with simple structures are provided. The two methods strike an advantageous tradeoff among detection delay at each channel, switching delays, and the error probabilities in a multichannel setup.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
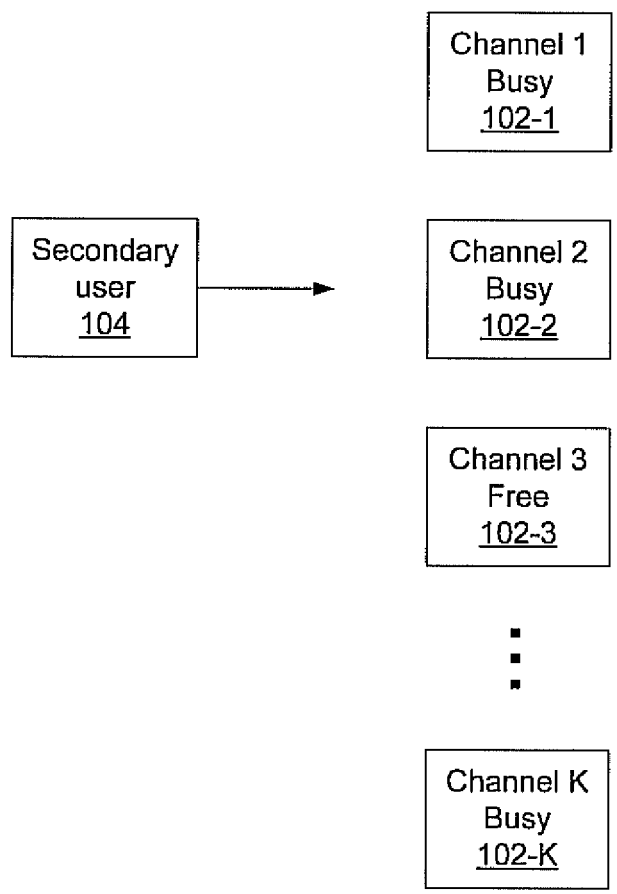
FIG. 1 is a block diagram of a secondary user searching for a free channel.

Referring now to the drawings in which like numerals represent the same or similar elements and initially to FIG. 1, a narrow-band communication system is shown in which an SU 104 is allowed to opportunistically access a licensed spectrum consisting of K non-overlapping channels 102 with equal bandwidth. It is assumed that the SU 104 has a single detector at its transmitter operating in half-duplex mode. Each channel has two possible states: "free" (e.g., 102-3) or "busy" (e.g., 102-1). A channel is said to be busy if the channel is currently being used by a primary user (PU) or SU. It is assumed herein that only one SU is present, but the present principles may be extended to detect other SUs as long as the average signal power of the SU is known. It may be further assumed that the states of the channels 102 are independent and identically distributed, such that the state of each channel is independent from the state of the others and each channel has the same prior probability $\pi_0$ of being free. The prior probability $\pi_0$ may be found by observing PU activity over time, and then used in subsequent channel searches. The SU needs to quickly find a free channel, or determine that there is no free channel, from the K candidate channels with a small chance of error.

For the $k^{th}$ channel 102, where $k \in [1,K]$, let $\{y_1^{(k)}, y_2^{(k)}, \ldots\}$ be a set of samples of channel k. For the free and busy states H (denoted as 0 and 1 respectively), the observed signals can be expressed as:

$$H_0^{(k)} \text{ (state 0)}: y_n^{(k)} = w_n^{(k)}, n=1,2,\ldots \quad (1)$$

$$H_1^{(k)} \text{ (state 1)}: y_n^{(k)} = h^{(k)} s_n^{(k)} + w_n^{(k)}, n=1,2,\ldots \quad (2)$$

where $w_n^{(k)}$ is modeled as an additive white Gaussian noise with variance $\sigma_w^2$ independent of the channel index (i.e., $w_n^{(k)} \sim CN(0, \sigma_w^2)$), $h^{(k)}$ is the kth channel coefficient between the PU using the channel and the SU 104, and $s_n^{(k)}$ denotes the primary signals transmitted over channel k at time instant n. It may further be assumed that: 1. the state of a channel 102 remains unchanged during the detection process, 2. the primary signal samples are independent and identically distributed with $E(|s_n^{(k)}|^2) = \sigma_s^2$, a parameter independent of channel index, and 3. the channel gain $h^{(k)}$ is perfectly known at the SU 104. The signal-to-noise ratio (SNR) may be defined as $\xi := |h^{(k)}|^2 \sigma_s^2 / \sigma_w^2$. The SU 104 performs a detection scheme to test $H_0^{(k)}$ against $H_1^{(k)}$ until a free channel is located or all the channels 102 are detected as busy.

Two sensing schemes in the single-channel case are relevant to the multi-channel case. The first is the sequential probability ratio test (SPRT) and the second is energy detection (ED). In SPRT, an accumulative log-likelihood ratio (LLR) is compared with two predetermined thresholds to test the null hypothesis $H_0$ against the alternative hypothesis $H_1$. To be more precise, the LLR of N received samples may be expressed as $$\Lambda_N = \sum_{n=1}^{N} \log \frac{p_1(y_n)}{p_0(y_n)}, \quad (3)$$

where $y_n$ denotes the received signal at time n, and $p_0(x)$ and $p_1(x)$ are the probability density functions under $H_0$ and $H_1$ respectively. At the $N^{th}$ time instant, the SPRT procedure is given as follows:

$$\text{Reject } H_0: \Lambda_N \geq a_s \quad (4)$$

$$\text{Accept } H_0: \Lambda_N \leq b_s \quad (5)$$

$$\text{Continue Sensing: } a_s < \Lambda_N < b_s \quad (6)$$

where $a_s$ and $b_s$ are two predetermined thresholds. For given false-alarm and misdetection probabilities $\alpha$ and $\beta$, $a_s$ and $b_s$ can be determined as follows:

$$a_s = \log \frac{\beta}{1-\alpha} \text{ and } b_s = \log \frac{1-\beta}{\alpha} \quad (7)$$

Note that assumption $a_s < b_s$ implies $\alpha + \beta < 1$.

Figure 2:
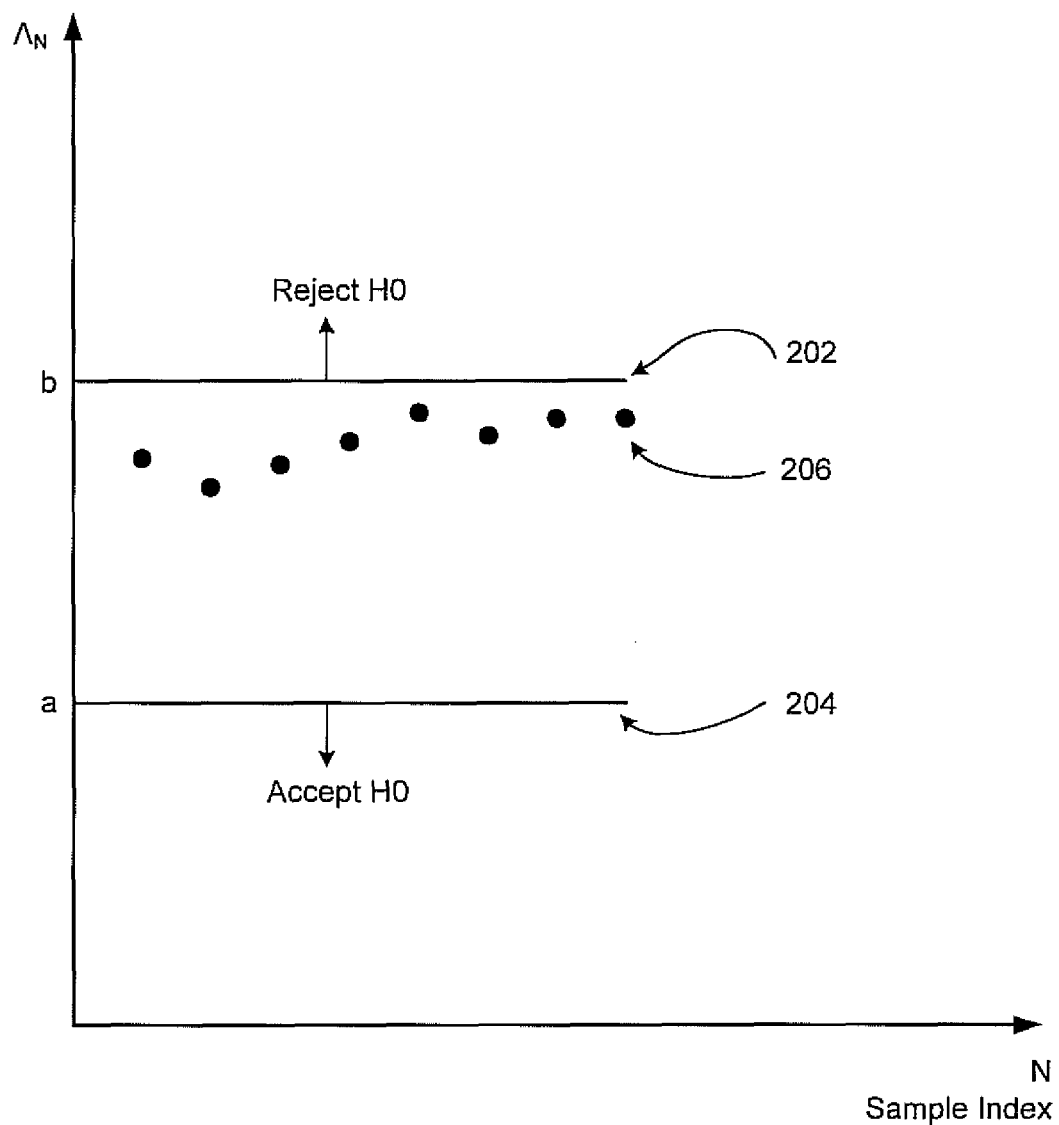
FIG. 2 is a graph which illustrates a sequential probability ratio test (SPRT).

Referring now to FIG. 2, a graph is shown comparing the test statistic to the thresholds $a_s$ 204 and $b_s$ 202 in the single channel case for an exemplary SPRT embodiment. The vertical axis represents the updated test statistic for each sample $y_n^{(k)}$ 206, and the horizontal axis represents a number of samples. As the samples accumulate, the test statistic is updated and progressively compared to the given thresholds. If the test statistic exceeds $a_s$ 204, the hypothesis $H_0$ (that the channel is free) is rejected. If the test statistic falls below $b_s$ 202, the hypothesis $H_0$ is accepted. If a maximum N samples are collected, a final decision is made by comparing the test statistic to a third threshold.

Figure 3:
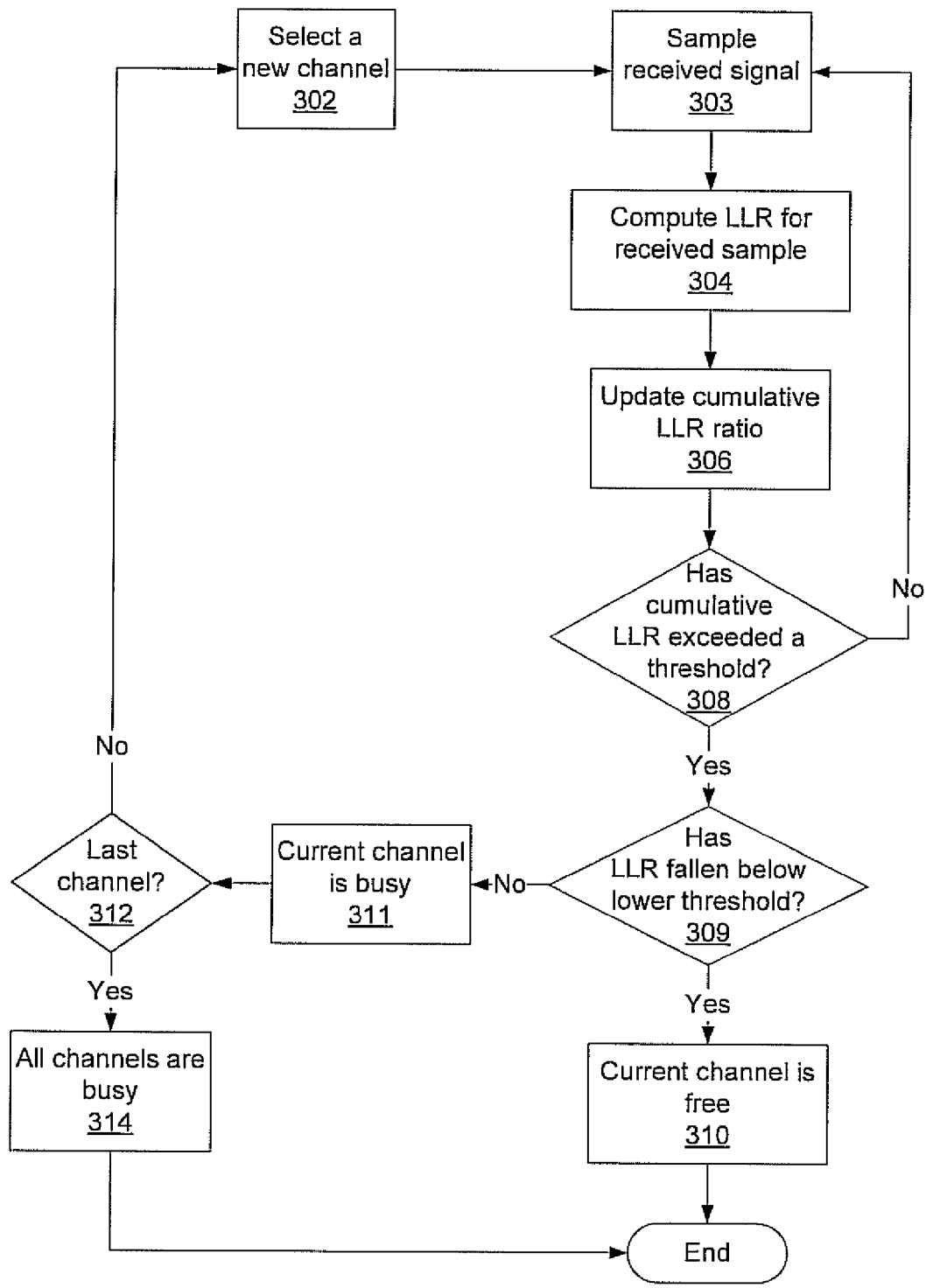
FIG. 3 is a block/flow diagram of sequential SPRT for multiple channels.

Referring now to FIG. 3, a block/flow diagram is shown using an exemplary sequential SPRT embodiment. A channel is selected at block 302. The signal on the selected channel is sampled at block 303, and an LLR is computed for that received sample at block 304. Block 306 then updates a cumulative LLR ratio for the current channel using the computed LLR. Block 308 determines whether the cumulative LLR has exceeded one of the thresholds. If not, processing returns to block 303 and the signal is sampled further. If so, block 309 determines whether the LLR exceeded the lower threshold. If the lower threshold was exceeded, block 310 determines that the selected channel is free. Otherwise, block 311 determines that the selected channel is busy. Block 312 determines whether the selected channel was the last channel from a set of K channels. If so, block 314 determines that all channels are busy. If not, a new channel is selected at block 302 and processing resumes.

Let $Z_n$ denote $\log(p_1(y_n)/p_0(y_n))$. Define $\mu_0 = E(Z_n|H_0)$ and $\mu_1 = E(Z_n|H_1)$. Let $t_s$ be the number of the samples required to reach a decision. Clearly, $t_s$ is a random variable. Under $H_0$, the average sample number (ASN) can be approximated as $E(t_s|H_0) = ((1-\alpha)a_s + \alpha b_s)/\mu_0$, whereas under $H_1$, the ASN can be approximated as $E(t_s|H_1) = (\beta a_s + (1-\beta)b_s)/\mu_1$. The ASN can be approximated as $$E(t_s) = E(t_s \mid H_0)\pi_0 + E(t_s \mid H_1)(1 - \pi_0) \qquad (8)$$

$$\approx \frac{\pi_0}{\mu_0}\left[(1-\alpha)\log\frac{\beta}{1-\alpha} + \alpha\log\frac{1-\beta}{\alpha}\right] +$$

$$\frac{1-\pi_0}{\mu_0}\left[\beta\log\frac{\beta}{1-\alpha} + (1-\beta)\log\frac{1-\beta}{\alpha}\right]$$

$$= \left[\frac{\pi_0(1-\alpha)}{\mu_0} + \frac{(1-\pi_0)\beta}{\mu_1}\right]\log\frac{\beta}{1-\alpha} +$$

$$\left[\frac{\pi_0\alpha}{\mu_0} + \frac{(1-\pi_0)(1-\beta)}{\mu_1}\right]\log\frac{1-\beta}{\alpha}$$

The approximation of $E(t_s)$ in (8) becomes fairly accurate in the following two cases. The first case is when $\alpha$ and $\beta$ are both very small while the second case is when $p_1(x)$ is sufficiently close to $p_0(x)$. In a CR network, the SU is required to detect the presence/absence of a PU with small error probabilities at a very low SNR. When the SNR is sufficiently low, $p_1(x)$ becomes fairly close to $p_0(x)$, and thus the approximation in (8) is highly accurate.

In ED, the energy of the received signal samples is first computed and then is compared to a predetermined threshold. Let $t_e$ be a fixed sample size and y be a $t_e \times 1$ vector defined as $y=(y_1,y_2,\ldots,y_{t_e})$. The test procedure of the energy detection is given as $$T(y) = \sum_{i=1}^{t_e} |y_i|^2 \underset{H_0}{\overset{H_1}{\gtrless}} \lambda$$

where $T(y)$ denotes the test statistic, and $\lambda$ denotes the threshold for energy detection.

Unlike in the SPRT, the sample size $t_e$ in energy detection is a fixed parameter, which is determined by the target false-alarm probability $\alpha$, the misdetection probability $\beta$, and a SNR value. Let $t_e^{min}$ be the minimum sample number required to achieve the target false-alarm probability $\alpha$ and misdetection probability $\beta$ when the SNR is $\xi$. This produces:

$$t_e^{min} = \lceil (\xi^{-2}[Q^{-1}(\alpha) - Q^{-1}(1-\beta)\sqrt{2\xi+1}]^2) \rceil \qquad (9)$$

where $\lceil x \rceil$ denotes the smallest integer not less than x, and $Q(\cdot)$ is the complementary cumulative distribution function of the standard normal random variable, i.e., $$Q(x) := (2\pi)^{-1/2} \int_{\tau}^{0} e^{-u/2} du,$$

while $Q^{-1}(\cdot)$ denotes its inverse function. Note that like the SPRT, (9) holds true only when $\alpha+\beta<1$.

Figure 4:
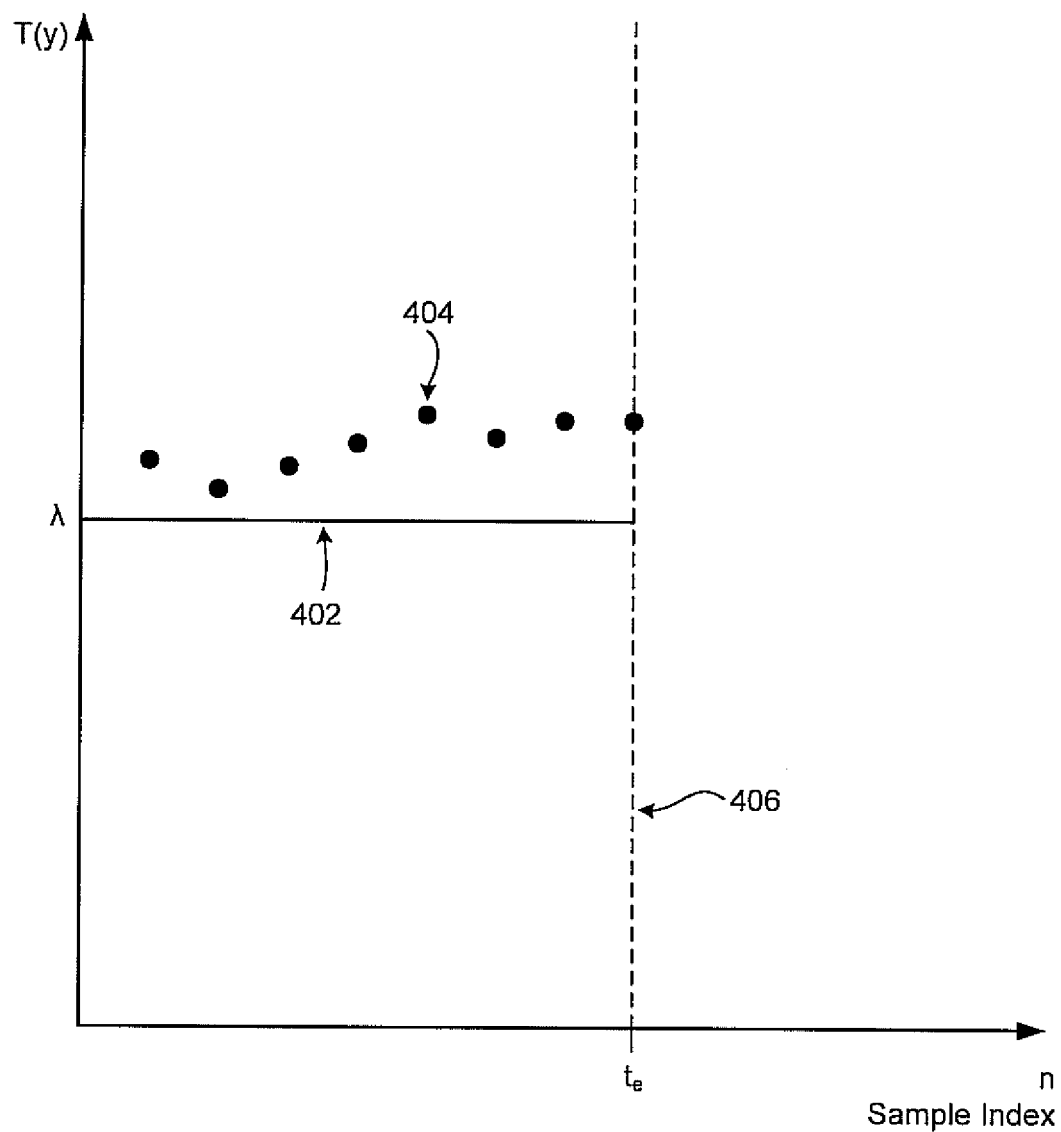
FIG. 4 is a graph which illustrates an energy detection (ED) test.

Referring now to FIG. 4, a graph is shown comparing the single-channel energy detection test statistic to the threshold $\lambda$ 402. The vertical axis represents the test statistic for a set of samples 404, and the horizontal axis represents a number of samples. After $t_e$ samples 406 have been collected, the test statistic $T(y)$ is compared. If the test statistic exceeds the threshold $\lambda$ 402 the hypothesis $H_0$ (that the channel is free) is rejected. If the test statistic is below $\lambda$ 402, the hypothesis $H_0$ is accepted.

Figure 5:
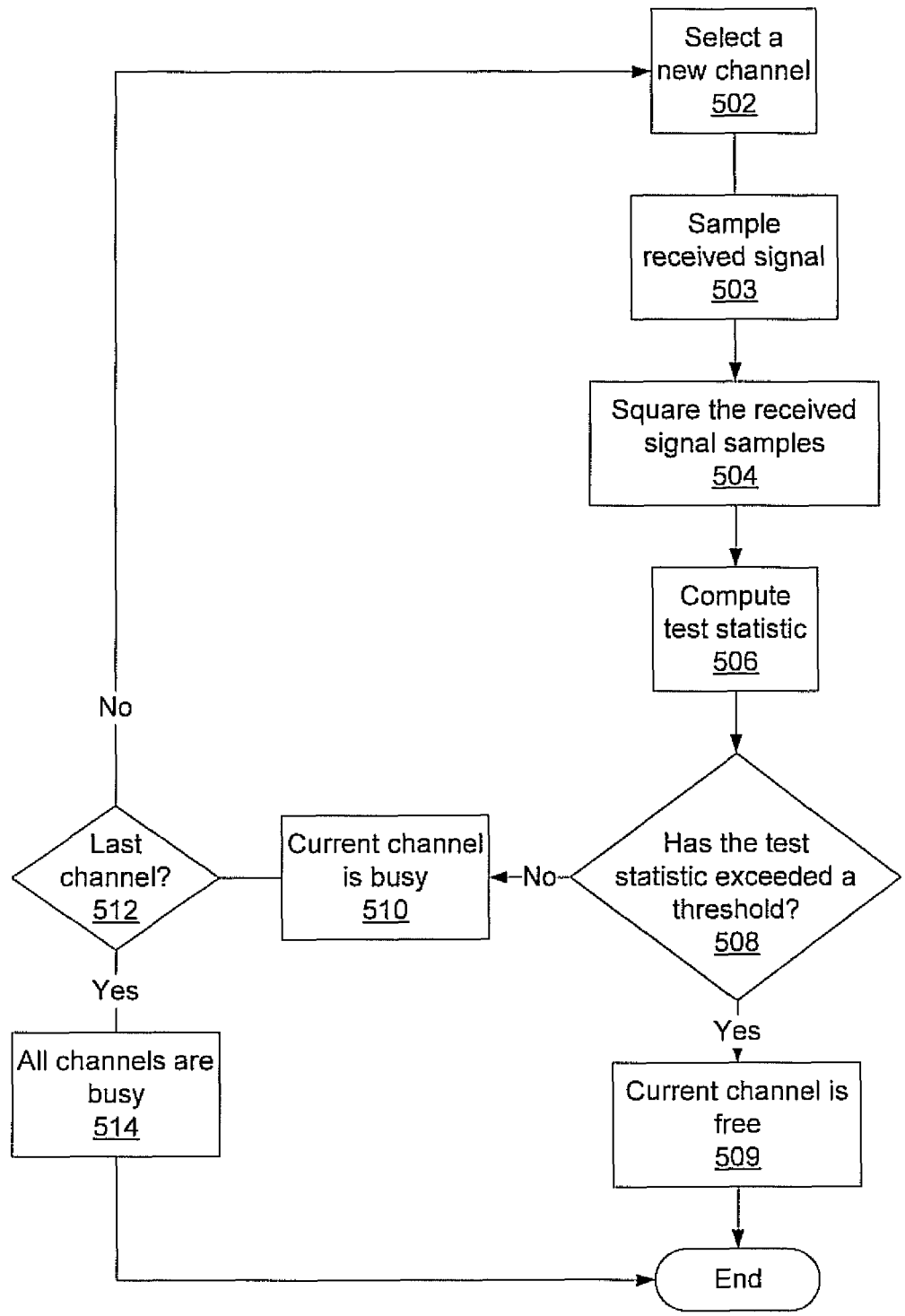
FIG. 5 is a block/flow diagram of a sequential ED test for multiple channels according to the present principles.

Referring now to FIG. 5, a block/flow diagram is shown for finding a free channel using an exemplary sequential ED embodiment. At block 502, the SU 104 selects a new channel which has not been tested yet. Changing the central frequency of the observing channel causes a switching delay. Block 503 then collects N samples $\{y_1^{(k)}, y_2^{(k)}, \ldots\}$ on the channel. Block 504 squares the magnitude of the received single samples $y_n^{(k)}$, allowing block 506 to compute a test statistic $$\Lambda_N^{(k)} = \sum_{n=1}^{N} |y_n^{(k)}|^2.$$

Block 508 determines whether the test statistic is greater than or equal to a threshold $\gamma$. If so, the current channel is declared free at block 509 and the SU uses said channel. If not, the current channel is declared busy at block 510. Block 512 determines if there are untested channels remaining. If not, block 514 declares that all channels are busy and processing ends. If so, processing returns to block 502 and a new channel is selected.

When designing a cognitive radio system, two error probabilities play a role: the false alarm probability $P_{FA}^{mc}$ and the misdetection probability $P_{MD}^{mc}$. Because the states of the K channels are independent and have the same a priori probabilities, it is assumed that each channel has the same target false-alarm probability $\alpha$ and the target same misdetection probability $\beta$ as defined in the single channel case. From a practical viewpoint, it is assumed that $\alpha>0$, $\beta>0$, and $\alpha+\beta>0$. The misdetection probability and the false alarm probability are used to form search parameters in S-ED and S-SPRT, as discussed below in FIGS. 6 and 7.

The false-alarm probability $P_{FA}^{mc}$ is defined as the probability of determining that all channels are busy while in fact there exists at least one free channel. Let $E_i$ denote the event that there exist exactly i free channels for $i=1, \ldots, K$ and let $D_1$ denote the event that the SU determines that all channels are busy. The false-alarm probability $P_{FA}^{mc}$ is then $$P\left(D_1 \,\middle|\, \bigcup_{i=1}^{K} E_i\right).$$

Mathematically, $P_{FA}^{mc}$ can be computed as follows:

$$P_{FA}^{mc} = P\left(D_1 \,\middle|\, \bigcup_{i=1}^{K} E_i\right) = \qquad (11)$$

$$\frac{P\left(D_1 \cap \bigcup_{i=1}^{K} E_i\right)}{P\left(\bigcup_{i=1}^{K} E_i\right)} = \frac{P\left(\bigcup_{i=1}^{K} (D_1 \cap E_i)\right)}{P\left(\bigcup_{i=1}^{K} E_i\right)} = \frac{\sum_{i=1}^{K} P(D_1 \cap E_i)}{P\left(\bigcup_{i=1}^{K} E_i\right)}.$$

Using the fact that the events $E_i$ are disjoint, $$P\left(\bigcup_{i=0}^{K} E_i\right)$$

is equal to 1, and the states of the channels are independent, one arrives at $$P\left(\bigcup_{i=1}^{K} E_i\right) = 1 - (1-\pi_0)^K. \quad (5)$$

$P(D_1 \cap E_i)$ is now computed. For any particular event from $E_i$, for example $E_i^0$, $P(D_1 \cap E_i^0)$ can be rewritten as $$P(D_1 \cap E_i^0) = P(D_1|E_i^0)P(E_i^0) = [\alpha\pi_0]^i[(1-\beta)(1-\pi_0)]^{K-i}. \quad (12)$$

$E_i$ includes $$\binom{K}{i}$$

disjoint such events. Hence, $$P(D_1 \cap E_i) = \binom{K}{i}[\alpha\pi_0]^i[(1-\beta)(1-\pi_0)]^{K-i}. \quad (13)$$

From (11), (12), and (13), $$P_{FA}^{mc} = \frac{\sum_{i=1}^{K} \binom{K}{i}[\alpha\pi_0]^i[(1-\beta)(1-\pi_0)]^{K-i}}{1-(1-\pi_0)^K}$$

$$= \frac{[\alpha\pi_0 + (1-\beta)(1-\pi_0)]^K - [(1-\beta)(1-\pi_0)]^K}{1-(1-\pi_0)^K} \quad (14)$$

Unlike the false-alarm probability in the single channel case, $P_{FA}^{mc}$ depends on $\pi_0$ in general except that $P_{FA}^{mc}$ reduces to $\alpha$ when K=1. Two monotonic properties of $P_{FA}^{mc}$ are described herein with respect to $\pi_0$ and $\beta$, respectively. First, the false alarm probability $P_{FA}^{mc}$ is a monotonically decreasing function on $\pi_0$ for given $\alpha$ and $\beta$. The least upper bound on $P_{FA}^{mc}$ is given by $\alpha(1-\beta)^{K-1}$ for any $0<\pi_0<1$, i.e., $$sup_{0<\pi_0<1} P\left(D_1 \middle| \bigcup_{i=1}^{K} E_i\right) = \alpha(1-\beta)^{K-1}$$

for $0<\pi_0<1$. Second, for any given $0<\alpha<1$ and $0<\pi_0<1$, the false alarm probability $P_{FA}^{mc}$ is a monotonically decreasing function of $\beta$.

The misdetection probability $P_{MD}^{mc}$ is defined as the probability of the event that a channel is determined to be free while it is in fact busy. Again, note that the misdetection probability is used to form search parameters for S-ED and S-SPRT, as shown below in FIGS. 6 and 7. Let $\tau$ denote the index of the channel at which the search ends. Let $D^{(\tau)}$ denote the event that the SU determines that channels 1 to $\tau-1$ are busy and channel $\tau$ is free, where $\tau \in \{1, \ldots, K\}$. With a slight abuse of notation, $H_1^{(\tau)}$ is used to denote the event that channel $\tau$ is indeed busy. Following the definition of $P_{MD}^{mc}$ and the fact that $D^{(\tau)} \cap H_1^{(\tau)}$ for $\tau=1, \ldots, K$ are disjoint events, the overall misdetection probability of a multichannel system is written as $$\sum_{\tau=1}^{K} P(D^{(\tau)} \cap H_1^{(\tau)}).$$

For a fixed $\tau$:

$$P(D^{(\tau)} \cap H_1^{(\tau)}) \stackrel{(a)}{=} P(D_0^{(\tau)} \cap H_1^{(\tau)}) \prod_{k=1}^{\tau-1} P^{(k)}$$

$$= P(D_0^{(\tau)} | H_1^{(\tau)}) P(H_1^{(\tau)}) \prod_{k=1}^{\tau-1} P(D_1^{(k)}|H_1^{(k)}) P(H_1^{(k)}) +$$

$$P(D_1^{(k)} | H_0^{(k)}) P(H_0^{(k)})$$

$$= \beta(1-\pi_0)[(1-\beta)(1-\pi_0) + \alpha\pi_0]^{\tau-1}$$

$$= \beta(1-\pi_0)[(\alpha+\beta-1)\pi_0 + (1-\beta)]^{\tau-1}$$

where $D_1^{(k)}$ denotes the event that the SU claims channel k as a busy channel for k=1, ..., $\tau-1$, $D_1^{(\tau)}$ denotes the event that the SU claims channel $\tau$ as a free channel, (a) follows directly from the independence of received signal samples from each channel. Denoting $(\alpha+\beta-1)\pi_0+(1-\beta)$ by $\phi$, this produces $P(D^{(\tau)} \cap H_1^{(\tau)}) = \beta(1-\pi_0)\phi^{\tau-1}$. $P_{MD}^{mc}$ can be written as $$P_{MD}^{mc} = \sum_{\tau=1}^{K} P(D^{(\tau)} \cap H_1^{(\tau)}) \quad (15)$$

$$= \beta(1-\pi_0) \sum_{\tau=1}^{K} \varphi^{\tau-1}$$

$$= \beta(1-\pi_0) \frac{1-\varphi^K}{1-\varphi}$$

Unlike the misdetection probability in the single channel case, $P_{MD}^{mc}$ depends on a priori probability $\pi_0$. It should be noted that when K=1, $P_{MD}^{mc}$ does not reduce to the misdetection probability $\beta$ in the single channel case. This is because the misdetection probability $\beta$ in the single channel case is a conditional probability while $P_{MD}^{mc}$ is defined as a joint probability.

Two monotonic properties of the misdetection probability $P_{MD}^{mc}$ are described herein. First, the misdetection probability $P_{MD}^{mc}$ is a monotonically decreasing function of $\pi_0$. Furthermore, the least upper bound on $P_{MD}^{mc}$ for $0<\pi_0<1$ is given by $1-(1-\beta)^K$. Second, for any given $0<<1$ and $0<\pi_0<1$, the misdetection probability $P_{MD}^{mc}$ is a monotonically increasing function of $\beta$.

Figure 6:
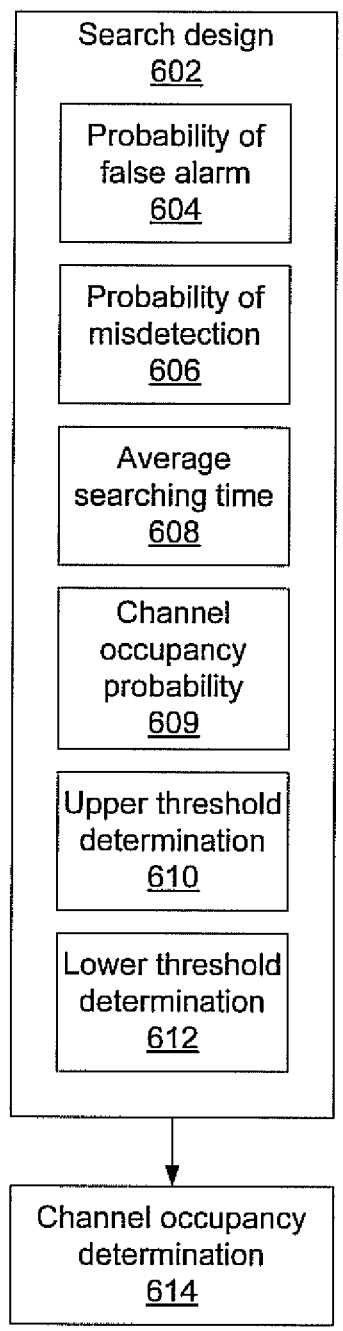
FIG. 6 is a block/flow diagram of an S-SPRT methodology including search design.
Figure 7:
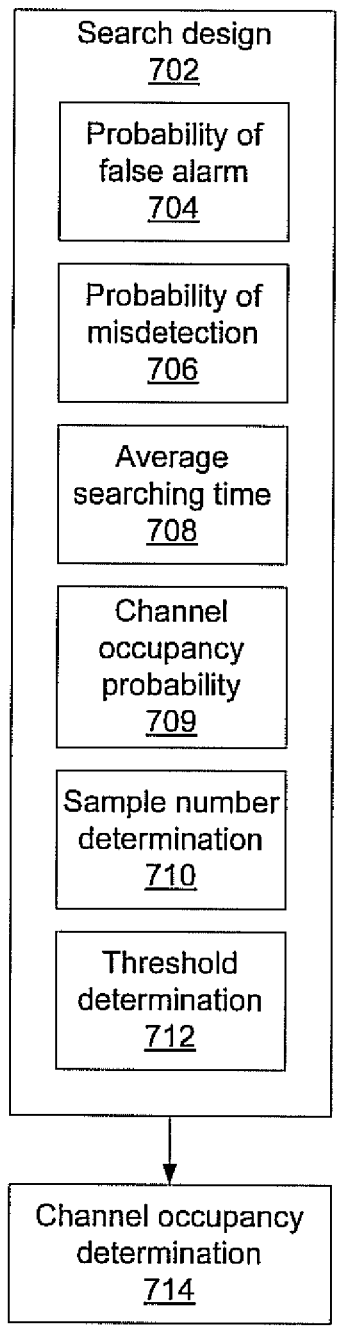
FIG. 7 is a block/flow diagram of an S-ED methodology including search design.

Another relevant quantity to S-ED and S-SPRT searches, as discussed below in FIGS. 6 and 7, is the average searching time of a channel search scheme. A searching time is a random variable having a value that is the sum of detection time and switching delays. T denotes the channel searching time. Let $t^{(k)}$ be the sensing time spent on channel k and let $\delta$ denote one switching delay—the amount of time it takes to tune to a new channel. It may be assumed that the switching delay $\delta$ is a constant. Recall that $\tau$ is the index of the channel at which a search ends. Using Wald's identity, the average searching time E(T) is written as follows $$E(T) = E\left(\sum_{k=1}^{\tau} t^{(k)} + (\tau - 1)\delta\right) \quad (16)$$
$$= E(\tau)(E(t) + \delta) - \delta$$

where E(t) denotes the expectation value of $t^{(k)}$. Note that in energy detection, t is a deterministic parameter and thus E(t) simply becomes t.

E(τ) may be evaluated now and represents the average number of channels 102 that have been visited by the SU 104. Clearly, τ is a random variable ranging from 1 to K. Let P(τ=k) denote the probability of the event that the SU 104 completes the search at channel k. If 1≤k<K, then τ=k implies that the SU claims that the first k−1 channels are busy and that the $k^{th}$ channel is free, while if k=K, τ=K implies that the SU 104 claims the first K−1 channels as busy channels. Based on these observations, P(τ=k) is written as $$P(\tau = k) = \begin{cases} P(D_0^{(k)})\prod_{l=1}^{k-1} P(D_1^{(l)}) = (1-\varphi)\varphi^{k-1}, & k = 1, \ldots, K-1 \\ \prod_{l=1}^{K-1} P(D_1^{(l)}) = \varphi^{K-1} & k = K. \end{cases} \quad (17)$$

Then, the average number of the channels visited by the SU 104 is given by $$E(\tau) = \sum_{k=1}^{K} kP(\tau = k) \quad (18)$$
$$= (1-\varphi)\sum_{k=1}^{K} k\varphi^{k-1} + K\varphi^K$$
$$= \frac{1-\varphi^K}{1-\varphi}$$

For given 0<α<1 and 0<$\pi_0$<1, the average number of channels visited by the SU is a monotonically decreasing function of β.

Referring again to FIG. 2, a channel search applies a detection scheme sequentially 212 to each channel 102 and such a detection scheme guarantees the same target α and β for each channel 102. Hence, the design of a channel search includes the design of a detection scheme that is sequentially applied to a candidate channel 102 to minimize the average searching time, subject to constraints on the false-alarm and misdetection probabilities of a multichannel system. Mathematically, this is formulated as the following optimization problem:

$$\underset{\alpha,\beta}{\text{minimize}}\, E(T) \quad (19)$$

subject to: $P_{FA}^{mc} \leq \overline{P}_{FA}^{mc}$, $P_{MD}^{mc} \leq \overline{P}_{MD}^{mc}$, $\alpha > 0$, and $\beta > 0$ where $\overline{P}_{FA}^{mc}$ and $\overline{P}_{MD}^{mc}$ represent target false-alarm and misdetection probabilities in a multichannel system. Advantageous characteristics of (19) include the minimization problem (19) being independent of a particular cost structure and taking switching delays into account.

In an SPRT-based channel search algorithm, an SPRT is sequentially applied to the candidate channels to achieve target $\overline{P}_{FA}^{mc}$ and $\overline{P}_{MD}^{mc}$ for a multichannel system. The present principles therefore provide a sequential SPRT (S-SPRT) search.

Referring now to FIG. 6, a block/flow diagram of S-SPRT is shown, including the search design. Block 602 incorporates the steps of designing an S-SPRT search, which includes finding an acceptable probability of false alarm at block 604, finding an acceptable probability of misdetection at block 606, setting an acceptable average searching time at block 608, and determining an a priori probability that any given channel is already occupied 609. These quantities are then used to determine an upper and a lower threshold at blocks 610 and 612 respectively. The thresholds are subsequently used in block 614 to locate a free channel, as described in FIG. 3 above.

Recall that the overall false-alarm and misdetection probabilities $P_{FA}^{mc}$ and $P_{MD}^{mc}$ and E(T) are functions of α and β, which are false-alarm and misdetection probabilities achieved by a SPRT on a single channel, respectively. Recall that in an SPRT, α and β need to satisfy α>0, β>0, and α+β<1. Using (8) and (18), (16) is rewritten as $$\underset{\alpha,\beta}{\min} E(T) = \frac{1-((\alpha+\beta-1)\pi_0+(1-\beta))^K}{\beta-(\alpha+\beta-1)\pi_0} \quad (20)$$

$$\left(\begin{bmatrix}\frac{\pi_0(1-\alpha)}{\mu_0} + \frac{(1-\pi_0)\beta}{\mu_1}\end{bmatrix} \times \right.$$
$$\left. \log\frac{\beta}{1-\alpha} + \right.$$
$$\left.\begin{bmatrix}\frac{\pi_0\alpha}{\mu_0} + \frac{(1-\pi_0)(1-\beta)}{\mu_1}\end{bmatrix}\log\frac{1-\beta}{\alpha} + \delta\right) - \delta$$

subject to: $\frac{[\alpha\pi_0+(1-\beta)(1-\pi_0)]^K - [(1-\beta)(1-\pi_0)]^K}{1-(1-\pi_0)^K} \leq \overline{P}_{FA}^{mc}$ $\beta(1-\pi_0)\frac{1-((\alpha+\beta-1)\pi_0+(1-\beta))^K}{\beta-(\alpha+\beta-1)\pi_0} \leq \overline{P}_{MD}^{mc}$ $\alpha + \beta < 1$
$\alpha > 0$
$\beta > 0$.

The objective function in (20), used in blocks 610 and 612, becomes accurate when both α and β are small or $p_1(x)$ is fairly close to $p_0(x)$. In general, the optimal values of α and β are not necessarily small. However, in a cognitive radio network, the case often arises where ξ is very low. In such a case, $p_0(x)$ and $p_1(x)$ are quite close and thus the objective function using the Wald's approximation becomes accurate.

In the energy detection based channel search algorithm, energy detection is applied sequentially to each channel. This energy detection based channel search is called a sequential energy detection (S-ED) search.

Referring now to FIG. 7, a block/flow diagram of S-ED is shown, including the search design. Block 702 incorporates the steps of designing an S-ED search, which includes finding an acceptable probability of false alarm at block 704, finding an acceptable probability of misdetection at block 706, setting an acceptable average searching time at block 708, and determining an a priori probability that any given channel is already occupied. These quantities are then used to determine a sample number and threshold at blocks 710 and 712 respectively. Detailed explanations and formulas for these quantities are provided above. The sample number and the threshold are subsequently used in block 714 to locate a free channel, as described in FIG. 5 above.

It can be assumed that the sample size in energy detection is chosen by (9) in block 710. According to (19):

$$\min_{\alpha,\beta} E(T) = \frac{1 - ((\alpha + \beta - 1)\pi_0 + (1 - \beta))^K}{\beta - (\alpha + \beta - 1)\pi_0} \quad (21)$$

$$\left(\left[\xi^{-2}\left[Q^{-1}(\alpha) - Q^{-1}(1 - \beta)\sqrt{2\xi + 1}\right]^2\right] + \delta\right) - \delta$$

subject to: $\frac{[\alpha\pi_0 + (1 - \beta)(1 - \pi_0)]^K - [(1 - \beta)(1 - \pi_0)]^K}{1 - (1 - \pi_0)^K} \leq \overline{P}_{FA}^{mc}$ $$\beta(1 - \pi_0)\frac{1 - ((\alpha + \beta - 1)\pi_0 + (1 - \beta))^K}{\beta - (\alpha + \beta - 1)\pi_0} \leq \overline{P}_{MD}^{mc}$$

$\alpha + \beta < 1$
$\alpha > 0$
$\beta > 0.$

In energy detection, the fixed sample size $t_e$ in (9) is obtained in block 710 based on the central limit theorem, which assumes that $t_e$ is sufficiently large. Roughly speaking, the values of $t_e$ become sufficiently large when the optimal values of $\alpha$ and $\beta$ are sufficiently small or the SNR value is very low. Similar to the S-SPRT case, the optimal $\alpha$ or $\beta$ is not necessarily small. However, since the low SNR detection is of practical interest in a CR network, the objective function in (9) is an accurate approximation at a low SNR level.

In order to determine an energy threshold $\lambda$ in block 712 for S-ED, equation (9) is used to produce $t_e$ using the same $\xi$ that is shown in the single-channel case. $\alpha$ is acquired from equation (21) and used in the formula:

$$\lambda = Q^{-1}(\alpha)\sigma_w^2\sqrt{t_e^{\min}} + \sigma_w^2$$

to find a suitable energy threshold. Problems (20) and (21) are nonlinear optimization problems and are not convex or concave in general. Finding a globally optimal solution is typically difficult. Since the optimization problems (20) and (21) have only two parameters $\alpha$ and $\beta$ that belong to a finite interval [0,1], one feasible approach to find a good suboptimal solution is an enumerative search solution. Specifically, $\alpha$ and $\beta$ are first quantized into discrete sets with small and even quantization intervals. Then an exhaustive enumeration of all possible quantized pairs $(\alpha,\beta)$ is performed to find a solution. The obtained solution may not be the optimal solution. Yet the enumerative search solution normally yields a good suboptimal solution as the quantization interval is sufficiently small. In addition, E(t) in the above two search algorithms is nondecreasing with respect to $\beta$. This implies that the optimal $\alpha$ and $\beta$ should satisfy the constraint on $P_{MD}^{mc}$ with equality, i.e., $P_{MD}^{mc} = \overline{P}_{MD}^{mc}$ for the optimal $\alpha$ and $\beta$. In practice, this observation can be used to reduce the number of possible $\alpha$ and $\beta$ pair values to be searched.

In simulations, it is assumed that the primary signals are independent and identically distributed complex Gaussian random values with mean zero and variance $\sigma_s^2$. Under this assumption, the probability density function (PDF) of $y_n^{(k)}$ under $H_0$, can be written as $$p_0(y_n^{(k)}) = \frac{1}{\pi\sigma_w^2}\exp\left(-\frac{|y_n^{(k)}|^2}{\sigma_w^2}\right) \quad (22)$$

whereas the PDF of $y_n^{(k)}$ under $H_1$ can be written as $$p_1(y_n^{(k)}) = \frac{1}{\pi(\sigma_s^2 + \sigma_w^2)}\exp\left(-\frac{|y_n^{(k)}|^2}{\sigma_s^2 + \sigma_w^2}\right). \quad (23)$$

The LLR of the received sample from channel k can be written as $$Z_n^{(k)} = \log\frac{p_1(y_n^{(k)})}{p_0(y_n^{(k)})} = \log r + |y_n^{(k)}|^2\left(\frac{1}{\sigma_w^2} - \frac{1}{\sigma_w^2 + \sigma_s^2}\right)$$

where $r = (1+\xi)^{-1}$. Furthermore, $\mu_0 = \log r + 1 - r$ and $\mu_1 = \log r + r^{-1} - 1$.

The above-described embodiments can be better understood in the context of the example scenario described in Table I. Table I lists numerical and simulation results of $P_{FA}^{mc}$, $P_{MD}^{mc}$, $E(\tau)$ and $E(T)$ for $K=8$, $\pi_0=0.5$ and $\xi=-5, -10, -15, -20$ dB. The numerical results of $P_{FA}^{mc}$, $P_{MD}^{mc}$, $E(\tau)$ and E( ) are obtained by evaluating (14), (15), (18), and (16) at corresponding $\alpha$ and $\beta$, respectively. A few observations can be readily made from Table I. First, the values of the SNR $\xi$ have considerable impact on the average searching time. Second, in both the S-SPRT and S-ED algorithms, the numerical and simulation results match quite well when $\xi$ varies from $-5$ dB to $-20$ dB. This is because the SNR levels are fairly low. Particularly, in the S-SPRT search algorithm, the differences in $P_{FA}^{mc}$ and $P_{MD}^{mc}$ between numerical and simulation results become smaller as $\xi$ decreases since $p_1(x)$ becomes closer to $p_0(x)$ as $\xi$ decreases. Second, when $\xi=-10, -15, -20$ dB, the obtained $\alpha$ and $\beta$ remain unchanged, which leads to the same value of $E(\tau)$.

TABLE 1

| Methods | S-SPRT | S-ED | S-SPRT | S-ED | S-SPRT | S-ED | S-SPRT | S-ED |
|---|---|---|---|---|---|---|---|---|
| $\xi$(dB) | −5 | −5 | −10 | −10 | −15 | −15 | −20 | −20 |
| $\alpha$ | 0.1706 | 0.1960 | 0.5589 | 0.5589 | 0.5589 | 0.5589 | 0.5589 | 0.5589 |
| $\beta$ | 0.0929 | 0.0902 | 0.0553 | 0.0553 | 0.0553 | 0.0553 | 0 0553 | 0.0553 |
| $P_{FA}^{mc}$ (Numerical) | 0.0054 | 0.0069 | 0.1000 | 0.0999 | 0.1000 | 0.1000 | 0.1000 | 0.1000 |
| $P_{MD}^{mc}$ (Numerical) | 0.1000 | 0.1000 | 0.1000 | 0.1000 | 0.1000 | 0.1000 | 0.1000 | 0.1000 |
| $P_{FA}^{mc}$ (Monte Carlo) | 0.0036 | 0.0068 | 0.0724 | 0.0970 | 0.0890 | 0.0993 | 0.0958 | 0.0998 |
| $P_{MD}^{mc}$ (Monte Carlo) | 0.0926 | 0.1001 | 0.1008 | 0.0927 | 0.0995 | 0.0971 | 0.1000 | 0.0996 |
| $E(\tau)$ (Numerical) | 2.15 | 2.22 | 3.62 | 3.62 | 3.62 | 3.62 | 3.62 | 3.62 |

TABLE 1-continued

| Methods | S-SPRT | S-ED | S-SPRT | S-ED | S-SPRT | S-ED | S-SPRT | S-ED |
|---|---|---|---|---|---|---|---|---|
| E(T) (Numerical) | 139.5 | 207.2 | 533.8 | 1056.9 | 3886.4 | 8242.1 | 36833 | 77589 |
| E($\tau$) (Monte Carlo) | 2.08 | 2.21 | 3.34 | 3.59 | 3.51 | 3.61 | 3.57 | 3.62 |
| E(T (Monte Carlo) | 146.1 | 206.4 | 558.2 | 1048 | 3998.1 | 8221.9 | 37200 | 77769 |

Table II lists numerical and simulation results for $P_{FA}^{mc}$, $P_{MD}^{mc}$, E($\tau$) and E(T) for $\xi$=0 dB, K=8, $\overline{P}_{FA}=\overline{P}_{MD}$=0.1 and $\delta$=0.1. As can be observed from the table, there exists some inconsistency between numerical results and simulation results. In particular, the constraints on $P_{MD}^{mc}$ are violated to some extent in the S-ED algorithm. This is mainly because the approximation based on the central limit theorem is no longer accurate when the fixed sample size $t_e$ is relatively small.

TABLE 2

| Methods | S-SPRT | S-ED | S-SPRT | S-ED | S-SPRT | S-ED |
|---|---|---|---|---|---|---|
| $\pi_0$ | 0.1 | 0.1 | 0.3 | 0.3 | 0.5 | 0.5 |
| $\alpha$ | 0.1604 | 0.1370 | 0.0500 | 0.0751 | 0.0293 | 0.0442 |
| $\beta$ | 0.0196 | 0.0197 | 0.0477 | 0.0467 | 0.1081 | 0.1063 |
| $P_{FA}^{mc}$ (Numerical) | 0.1000 | 0.0845 | 0.0081 | 0.0127 | 0.0005 | 0.0007 |
| $P_{MD}^{mc}$ (Numerical) | 0.1000 | 0.1000 | 0.1000 | 0.1000 | 0.1000 | 0.1000 |
| $P_{FA}^{mc}$ (Monte Carlo) | 0.0492 | 0.0967 | 0.0042 | 0.0134 | 0.0003 | 0.0008 |
| $P_{MD}^{mc}$ (Monte Carlo) | 0.0866 | 0.1077 | 0.0806 | 0.1194 | 0.0820 | 0.1223 |
| E($\tau$) (Numerical) | 5.67 | 5.62 | 2.99 | 3.06 | 1.85 | 1.88 |
| E(T) (Numerical) | 269.9 | 354.6 | 130.5 | 161.1 | 60.7 | 72.1 |
| E($\tau$) (Monte Carlo) | 5.56 | 5.64 | 2.98 | 3.03 | 1.86 | 1.85 |
| E(T) (Monte Carlo) | 281.8 | 350.2 | 138.7 | 158.9 | 65.9 | 70.5 |

A third example shows how inaccurate knowledge of a priori probability $\pi_0$ affects the performance of the search algorithms. Let $\hat{\pi}_0$ be the estimate of $\pi_0$ and let $\hat{\alpha}$ and $\hat{\beta}$ be the optimal parameters corresponding to $\hat{\pi}_0$, as calculated in blocks 604, 606, 704, and 706. In the following two cases, K=8, and $\overline{P}_{MD}^{mc}=\overline{P}_{FA}^{mc}$=0.1.

The first case is underestimation, wherein ($\hat{\pi}_0<\pi_0$). It is assumed that the true value of $\pi_0$ is 0.8 and $\xi$=−5 dB. Let $E_{\pi_0}(T)$ denote the average searching time obtained by using $\alpha$ and $\beta$ corresponding to $\hat{\pi}_0$ and $E_{\hat{\pi}_0}(T)$ denote the average searching time obtained in blocks 608 and 708 by using $\alpha$ and $\beta$ corresponding to $\pi_0$. $P_{FA}^{mc}$ and $P_{MD}^{mc}$ are monotonically decreasing functions on $\pi_0$. This implies that $\alpha$ and $\beta$ obtained from $\hat{\pi}_0$ will still meet the constraints on $P_{FA}^{mc}$ and $P_{MD}^{mc}$ as $\hat{\pi}_0<\pi_0$. Hence, only the impact of underestimating $\pi_0$ on E(T) is relevant. To do so, the parameter $\Delta_U$ is defined as $\Delta_U:=(E_{\pi_0}(T)-E_{\hat{\pi}_0}(T))/E_{\pi_0}(T)$, which is used to indicate the sensitivity of E(T) to the underestimation of $\pi_0$. $\Delta_U$ decreases as the estimate $\hat{\pi}_0$ varies from 0.1 to 0.8. It can also be observed from the figure that both algorithms are sensitive to the underestimation of $\pi_0$ and the S-ED search algorithm is more sensitive than the S-SPRT search algorithm.

In the case of overestimation ($\hat{\pi}_0>\pi_0$), it is assumed that the true value of $\pi_0$ is 0.2 and $\xi$=−15 dB. In the overestimation case, $\alpha$ and $\beta$ are obtained by using $\hat{\pi}_0>\pi_0$. Unlike the underestimation case, the constraints on $P_{FA}^{mc}$ and $P_{MD}^{mc}$ are not necessarily satisfied in the overestimation case. Recall that the optimal $\alpha$ and $\beta$, if any, always satisfy the constraint on $P_{MD}^{mc}$ with equality. Since $P_{MD}^{mc}$ is decreasing on $\pi_0$ and $\hat{\pi}_0>\pi_0$, $\alpha$ and $\beta$ obtained in blocks 604, 606, 704, and 706 by assuming $\hat{\pi}_0$ will result in violation of the constraint on $P_{MD}^{mc}$. To study how the overestimation of $\pi_0$ affects the constraint on $P_{MD}^{mc}$ we define the parameter $\Delta_O$ as $\Delta_O:=(\overline{P}_{MD}^{mc}-P_{MD}^{mc})/P_{MD}^{mc}$. $\Delta_O$ increases as the estimate $\hat{\pi}_0$ increases from 0.2 to 0.9. It can be also observed that both S-SPRT and S-ED suffer from similar amount of sensitivity to the overestimation of $\pi_0$.

Figure 8:
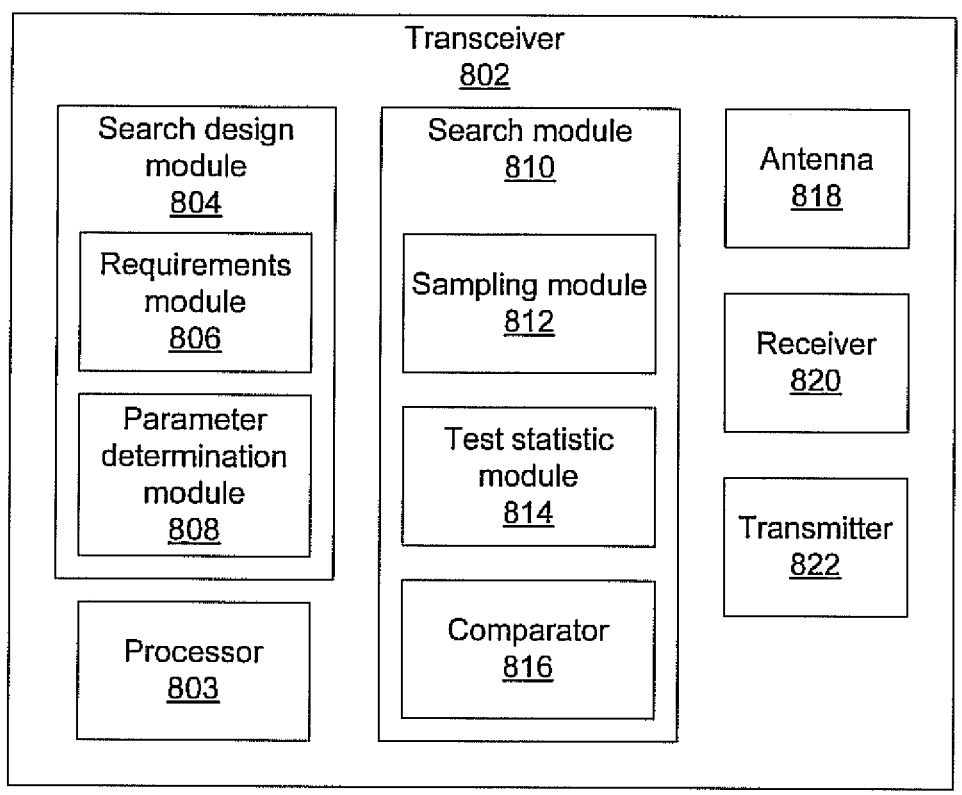
FIG. 8 is a diagram of an exemplary cognitive radio transceiver.

Referring now to FIG. 8, an exemplary transceiver 802 is shown that implements a search designed according to the present principles. A processor 803 is used to design and implement a search for a free channel. A search design module 804 includes a requirements module 806 which stores or accepts (through user input) search requirements such as an acceptable misdetection probability, an acceptable false alarm probability, and an average search time. A parameter determination module 808 uses a processor to determine a number of samples and a threshold for use in the search. A search module 810 uses these parameters, where a sampling module 812 samples a channel the determined number of times via antenna 818, a test statistic module 814 uses a processor to calculate a test statistic based on the received samples, and a comparator 816 determines whether the test statistic exceeds the determined threshold. If the search module finds a free channel, the transceiver stays tuned to the channel and uses 818 to communicate.

Having described preferred embodiments of a system and method for cognitive radio channel searching with energy detection (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for cognitive radio channel searching, the method comprising:

determining an energy detection threshold and a number of samples that will find a free channel in a minimum searching time, based on a number of channels K and a channel occupancy probability $\pi_0$, constrained by a target acceptable misdetection probability and a target acceptable false alarm probability; and searching the K channels with a signaling device using the determined energy detection threshold and the determined number of samples to find a free channel, wherein determining comprises determining the number of samples based on the target misdetection $\alpha_t$ probability and the target false alarm probability $\beta_t$, and wherein determining a number of samples includes solving for a minimum number of samples needed to achieve the target acceptable misdetection and false alarm probabilities $t_e^{min}$;

$$t_e^{min} = \lceil (\xi^{-2}[Q^{-1}(\alpha_t) - Q^{-1}(1-\beta_t)\sqrt{2\xi+1}]^2) \rceil$$

where $\lceil \cdot \rceil$ denotes the smallest integer not less than x, $Q(\cdot)$ is the complementary cumulative distribution function of the standard normal random variable, $\xi$ is the signal-to-noise ratio, and $\alpha_t$ and $\beta_t$ are the target acceptable false alarm and misdetection probabilities respectively.

2. The method of claim 1, wherein searching the K channels comprises sampling a channel a determined number of times and calculating a test statistic based on the samples for the channel.

3. The method of claim 2, wherein searching the K channels further comprises comparing the test statistic to the determined threshold to determine whether the channel is free.

4. The method of claim 2, wherein the test statistic $\Lambda_N^{(k)}$ is $$\Lambda_N^{(k)} = \sum_{n=1}^{N} |y_n^{(k)}|^2,$$

where k is an index designating the channel currently under search, N is the maximum number of samples, and $y_n^{(k)}$ is the $n^{th}$ sample on channel k.

5. A cognitive radio device, comprising:

a search parameter determination module configured to determine an energy detection threshold and a number of samples that will find a free channel in a minimum searching time, based on a number of channels K and a channel occupancy probability $\pi_0$, constrained by a target acceptable misdetection probability and a target acceptable false alarm probability; and a search module configured to search the K channels with a signaling device using the determined energy detection threshold and the determined number of samples to find a free channel, wherein the search parameter determination module is configured to determine the number of samples based on the misdetection probability and the false alarm probability, and wherein the search parameter determination module is configured to determine a number of samples needed to achieve the target acceptable misdetection and false alarm probabilities $t_e^{min}$:

$$t_e^{min} = \lceil (\xi^{-2}[Q^{-1}(\alpha_t) - Q^{-1}(1-\beta_t)\sqrt{2\xi+1}]^2) \rceil$$

where $\lceil \cdot \rceil$ denotes the smallest integer not less than x, $Q(\cdot)$ is the complementary cumulative distribution function of the standard normal random variable, $\xi$ is the signal-to-noise ratio, and $\alpha_t$ and $\beta_t$ are the target acceptable false alarm and misdetection probabilities respectively.

6. The cognitive radio device of claim 5, wherein the search modules is configured to sample a channel a determined number of times and calculating a test statistic based on the samples for the channel.

7. The cognitive radio device of claim 6, wherein the search modules is configured to compare the test statistic to the determined threshold to determine whether the channel is free.

8. The cognitive radio device of claim 6, wherein the test statistic $\Lambda_N^{(k)}$ is $$\Lambda_N^{(k)} = \sum_{n=1}^{N} |y_n^{(k)}|^2,$$

where k is an index designating the channel currently under search, N is the maximum number of samples, and $y_n^{(k)}$ is the $n^{th}$ sample on channel k.

* * * * *